UNITED STATES PATENT OFFICE.

JOHN S. DUNHAM, OF ST. LOUIS, MISSOURI.

CONFECTION.

SPECIFICATION forming part of Letters Patent No. 281,849, dated July 24, 1883.

Application filed June 19, 1883. (No specimens.)

*To all whom it may concern:*

Be it known that I, JOHN S. DUNHAM, of the city of St. Louis, in the State of Missouri, have invented a certain new and useful confection for the use of bakers, confectioners, and families, of which the following is a full, clear, and exact description.

I first take ten parts refined white sugar, and add sufficient water to dissolve it, and cook to a "crack," when I add and intimately mix ten parts finely-grated desiccated cocoa-nut-meat, or a like quantity of the powdered meat of other nuts, to which has been added two parts of starch. The mass is stirred until the boiling sirup is all absorbed, when it takes the form of a dry powder. An additional ten parts of refined white sugar and three parts of white of egg are now added, and the mass desiccated at or below a temperature 140° Fahrenheit, and, when thoroughly dry, repowdered. To the powdered mass is added one part powdered gum-tragacanth and two parts of baking-powder, and intimately mix the mass, which consists of a dry powder, that can be exposed to the atmosphere and will keep sweet for an indefinite period, and, by the addition of sufficient water to form a paste, is ready for baking.

The distinguishing features of my invention consist of first combining the powdered meat of nuts with sugar and starch in such a manner that the oil will not come out while undergoing the baking process and injure the other ingredients of the mixture, and the addition of powdered gum-tragacanth and baking-powder, which ingredients, so far as I can ascertain, have not heretofore been employed in the production of any similar preparation. When water is added, the gum-tragacanth forms a tough elastic body in the paste, similar to that of gluten in the flour, and prevents the carbonic-acid gas generated from the baking-powder escaping during the baking process. Consequently the cakes or macaroons are light and porous and of superior quality to those produced by the ordinary process, where about one-third of the entire mixture is required to be white of egg.

By this process I can prepare for the market a superior article at less cost than a compound requiring to be tightly canned for its preservation. Hitherto it has been found difficult to use the meat of desiccated cocoanut, owing to the oil coming out during the process of baking.

I claim—

1. The described process of combining the powdered or grated meats of nuts with sugar and starch, by which they are rendered capable of baking with other ingredients without the escape of oil from the mass.

2. The described mixture with the meats of nuts, of sugar, starch, gum-tragacanth, white of egg, and baking-powder, in about the proportions set forth, and in the manner described.

JOHN S. DUNHAM.

Witnesses:
GEO. H. KNIGHT,
SAML. KNIGHT.